United States Patent
Parker et al.

(10) Patent No.: US 7,106,366 B2
(45) Date of Patent: Sep. 12, 2006

(54) IMAGE CAPTURE SYSTEM INCORPORATING METADATA TO FACILITATE TRANSCODING

(75) Inventors: Martin A. Parker, Rochester, NY (US); Rajan L. Joshi, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 907 days.

(21) Appl. No.: 10/025,529

(22) Filed: Dec. 19, 2001

(65) Prior Publication Data

US 2003/0122942 A1  Jul. 3, 2003

(51) Int. Cl.
H04N 5/228 (2006.01)
G06K 9/46 (2006.01)

(52) U.S. Cl. .................... 348/222.1; 382/238; 382/240

(58) Field of Classification Search ................ 382/238, 382/240; 348/222.1
See application file for complete search history.

(56) References Cited

U.S. PATENT DOCUMENTS

| | | | |
|---|---|---|---|
| 5,673,355 A * | 9/1997 | Strolle et al. .................. 386/9 |
| 5,697,001 A | 12/1997 | Ring et al. |
| 5,835,616 A * | 11/1998 | Lobo et al. ................ 382/118 |
| 5,913,088 A | 6/1999 | Moghadam et al. |
| 5,978,514 A | 11/1999 | Yamaguchi et al. |
| 6,211,911 B1 * | 4/2001 | Komiya et al. .......... 348/218.1 |
| 6,282,317 B1 | 8/2001 | Luo et al. |
| 6,297,825 B1 * | 10/2001 | Madden et al. ............ 345/419 |
| 6,335,763 B1 * | 1/2002 | Nishio et al. .............. 348/564 |
| 6,393,056 B1 * | 5/2002 | Talluri et al. .............. 375/240 |
| 6,668,093 B1 * | 12/2003 | Zeck ......................... 382/244 |
| 6,704,434 B1 * | 3/2004 | Sakoh et al. ................ 382/104 |

FOREIGN PATENT DOCUMENTS

| | | |
|---|---|---|
| EP | 0 735 773 A1 | 10/1996 |
| WO | WO 99/49412 | 9/1999 |
| WO | WO 01/18563 | 3/2001 |
| WO | WO 01/69936 A2 | 9/2001 |

OTHER PUBLICATIONS

U.S. Appl. No. 09/898,230, filed May 2005, Rajan L. Joshi et al.
IEEE Transactions on Acoustics, Speech, and Signal Processing, vol. 36, No. 9, Sep. 1988, by Yair Shoham, et al., titled "Efficient Bit Allocation for an Arbitrary Set of Quantizers," pp. 1445-1453.
J. Soc. Photogr. Sci. Technol. Japan, vol. 59, No. 1, 1996, by Hsien-Che Lee, titled "Color Image Quantization Based on Physics and Psychophysics," pp. 212-225.
IEEE Transactions on Image Processing, vol. 9, No. 7, Jul. 2000, by David Taubman, titled, "High Performance Scalable Image Compression with EBCOT," pp. 1158-1170.
Internation Telecommunication Union, The International Telegraph and Telephone Consultative Committee, CCITT, T.81, Sep. 1992, titled Information Technology—Digital Compression and Coding of Continuous-Tone Still Images—Requirements and Guidelines.

(Continued)

Primary Examiner—Ngoc-Yen Vu
Assistant Examiner—Adam L Henderson
(74) Attorney, Agent, or Firm—Stephen H. Shaw

(57) ABSTRACT

A method for generating an enhanced compressed digital image, including the steps of: capturing a digital image; generating additional information relating to the importance of photographed subject and corresponding background regions of the digital image; compressing the digital image to form a compressed digital image; associating the additional information with the compressed digital image to generate the enhanced compressed digital image; and storing the enhanced compressed digital image in a data storage device.

11 Claims, 11 Drawing Sheets

OTHER PUBLICATIONS

"JPEG, Still Image Data Compression Standard," by William B. Pennebaker and Joan L. Mitchell, 1993.

"JPEG2000 Image Coding System," ISO/IEC International Standard 15444-1, ITU Recommendation T.800,2000.

"Probabilistic Reasoning in Intelligent Systems: Networks of Plausible Inference," by Judea Pearl, 1988.

"A ROI Approach for Hybrid Image Sequence Coding" by E. Nguyen, C. Labit and J-M Odobez. *Proceedings of the International Conference on Image Processing (ICIP)*, Austin, Nov. 13-16, 1994, Los Alamitos, IEEE Comp. Soc. Press, US, vol. 3, Conf. 1, Nov. 13, 1994, pp. 245-249.

"The Video Z-buffer: A Concept for Facilitating Monoscopic Image Compression by Exploiting the 3-D Stereoscopic Depth Map" by Sriram Sethuraman and M.W. Siegel. Oct. 1996, The Robotics Institute, School of Computer Science, Carnegie Mellon University, Pittsburgh.

"A Multilevel Bayesian Network Approach to Image Sensor Fusion" by Amit Singhal, Jiebo Luo, Christopher Brown. *Proceedings of the Third International Conference on Information Fusion*, Paris, vol. 2, Jul. 10, 2000, pp. 9-16.

"The JPEG2000 Still Image Coding System: An Overview" by Charilaos Christopoulos, Athanassios Skodras, and Touradj Ebrahimi. IEEE Transactions on Consumer Electronics, IEEE Inc., New York, US. vol. 46, No. 4, Nov. 2000, pp. 1103-1127.

Optimum Classification in Subband Coding of Images by Rajan L. Joshi, Thomas R. Fischer, and Roberto H. Bamberger. Proceedings of the International Conference on Image Processing (ICIP), Austin, Nov. 13-16, 1994, Los Alamitos, IEEE Comp. Soc. Press, US, vol. 3, CONF. 1, Nov. 13, 1994, pp. 883-887.

Serving Video in Any Format: Interview with Vingage CEO Daniel Schiappa, by Paul Worthington, The Future Image Report, V. 8, issue 3. 2000 Future Image Inc. San Mateo, CA.

* cited by examiner

IMAGE CAPTURE SYSTEM INCORPORATING METADATA TO FACILITATE TRANSCODING

FIELD OF THE INVENTION

The present invention relates to digital image processing, and more particularly to processing digital images and digital motion image sequences captured by relatively high resolution digital cameras.

BACKGROUND OF THE INVENTION

Digital cameras and digital video camcorders are becoming more popular with consumers as a result of decreasing cost, increasing performance, and convenience. Many digital cameras on the market today produce still images having two million pixels or more, and some are capable of capturing short motion sequences of modest quality. Digital video cameras produce very high-quality digital video with bit-rates on the order of 25 million bits/second, and some can produce megapixel-resolution still images.

As these devices become more common, there will be an increased desire for transmitting digital images and digital motion sequences over the Internet. Unfortunately, even relatively low bit-rate motion sequences create large amounts of data that can be unwieldy for low-bandwidth channels such as dial-up internet connections. The transmission of such quantities of data via email may even be prohibited by certain internet service providers.

Farther into the future, the quality and duration of motion capture on digital still camcorders will gradually approach that of today's digital video camcorders. Digital still images will continue to increase in resolution, though perhaps at a slower pace. The quantity of data required to represent this imagery will increase commensurately.

On the other hand, relatively low-bandwidth devices and connections will become more numerous as small internet appliances, multimedia-capable handheld computers, cellular phones, and other wireless devices proliferate. It will be increasingly necessary, therefore, to further compress high-quality digital images and digital motion sequences for low-bit rate channels and devices. This process is sometimes referred to as transcoding. Unfortunately, there are many instances in which aggressive image compression degrades everything in the scene with equal vigor; subjects as well as background regions become obscured by severe compression artifacts, resulting in an unnatural image and an annoying viewing experience.

One can envision improved transcoding algorithms that incorporate a variety of segmentation and "image understanding" techniques in order to selectively and intelligently vary the compression ratio for each segment or object in a digital image or frame. Unfortunately, because these algorithms are conventionally invoked after the time of capture, they may be challenged by the artifacts and general loss of information caused by any initial compression.

There is a need, therefore to improve the transcoding process for digital images and digital video sequences for low bandwidth devices.

SUMMARY OF THE INVENTION

The need is met according to the present invention by providing a method for generating an enhanced compressed digital image, including the steps of: capturing a digital image; generating additional information relating to the importance of photographed subject and corresponding background regions of the digital image; compressing the digital image to form a compressed digital image; associating the additional information with the compressed digital image to generate the enhanced compressed digital image; and storing the enhanced compressed digital image in a data storage device.

The need is also met according to the present invention by providing a method for recompressing a decompressed digital image using a main subject belief map to generate a recompressed digital image, comprising the steps of: performing wavelet decomposition on the decompressed digital image to produce an array of wavelet coefficients that can be used to reconstruct the decompressed digital image by summing corresponding synthesis basis functions weighted by the wavelet coefficients; deriving a distortion-weighting factor from the belief map for each transform coefficient; and producing a recompressed digital image not exceeding a target size from the wavelet coefficients using the distortion-weighting factors to minimize an error function.

The need is also met according to the present invention by providing a system for generating an enhanced compressed digital image, comprising: means for compressing a digital image to form a compressed digital image; means for generating additional information that relates to a photographed subject's importance with regard to the captured digital image, and corresponding background regions of the captured digital image; means for weighing the additional information relative to the photographed subject's importance with regard to the captured digital image such that weighted additional information is produced; and means for associating the weighted additional information with the compressed digital image to produce the enhanced compressed digital image.

Additionally, the need is met according to the present invention by providing a system for transcoding an enhanced compressed digital image, comprising: means for extracting additional information from the enhanced compressed digital image; means for extracting a compressed digital image from the enhanced compressed digital image; means for decompressing the compressed digital image to form a decompressed digital image and; means for further compressing the decompressed digital image responsive to the additional information to generate a recompressed digital image not exceeding a bit stream target size.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

The present invention will be described as implemented in a programmed digital processor in a camera and a programmed digital computer for processing the image from the camera. It will be understood that a person of ordinary skill in the art of digital image processing and software programming will be able to program a computer to practice the invention from the description given below. The present invention may be embodied in a camera and a computer program product, the latter having a computer-readable storage medium such as a magnetic or optical storage medium bearing machine readable computer code. Alternatively, it will be understood that the present invention may be implemented in hardware or firmware on either or both camera and computer.

Figure 1:
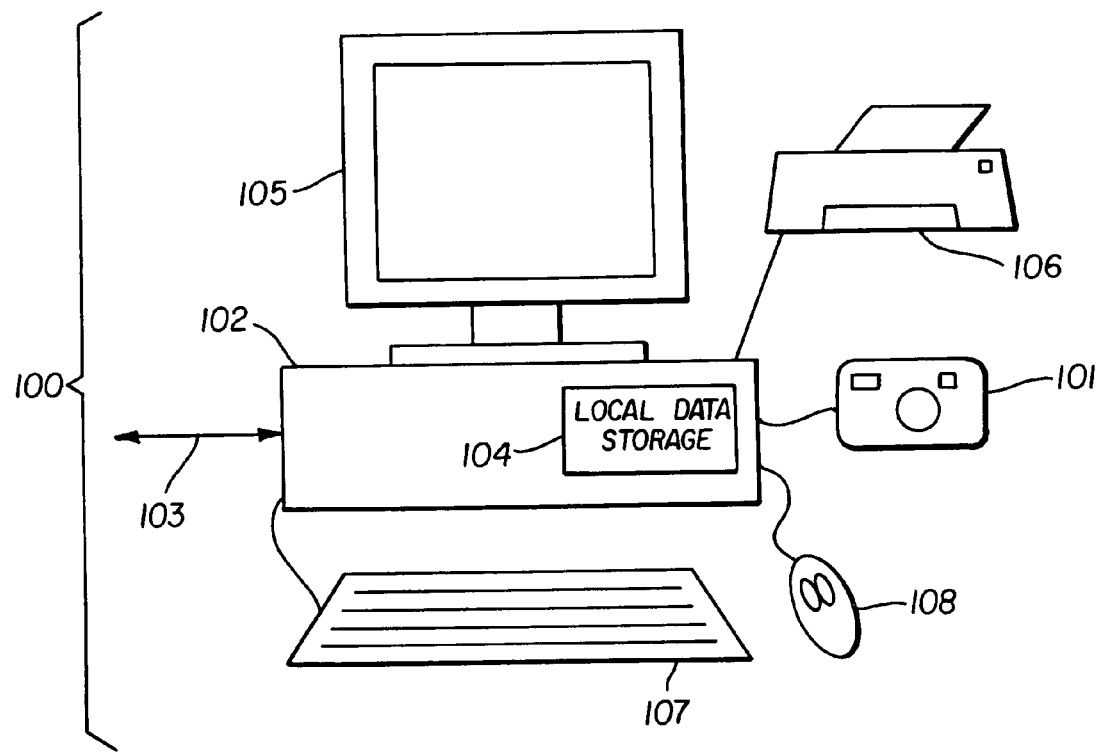
FIG. 1 is a block diagram of a prior art digital image capture and processing system.

Referring to FIG. 1, a prior art digital image capture and processing system 100 that is useful for practicing the present invention is shown. The system includes a digital image capture device 101 and a computer 102 that is electrically connected to a network 103, either directly with wires or wirelessly. The digital image capture device 101 can be a high-resolution digital camera with motion capture capability or a digital video camcorder. The computer 102 can be, for example, a personal computer running a popular operating system, or a handheld device. The computer 102 incorporates local data storage 104, for example a magnetic hard disk drive, a random access memory chip (RAM), or a read only memory chip (ROM), with sufficient capacity to store multiple high-quality digital images and motion sequences from the digital image capture device 101. The computer 102 communicates with the network 103, which could be a wide area network or a broadband network with sufficient capacity to handle digital motion sequences of some quality level and capable of communicating with a wide variety of other devices such as other desktop computers, multimedia-capable handheld computers, dedicated image display devices, electronic directional finders, such as global positioning systems (GPS), or multimedia-capable cellular phones. The computer 102 and the digital image capture device 101 may also be integrated as one. The digital image capture and processing system 100 also includes one or more display devices electrically connected to the computer 102, such as a high resolution color monitor 105, or hard copy output printer 106 such as a thermal or inkjet printer or other output device. An operator input, such as a keyboard 107 and "mouse" 108, may be provided on the system. The high resolution color monitor 105 may also function as an input device with the use of a stylus or a touch screen.

Figure 2A:
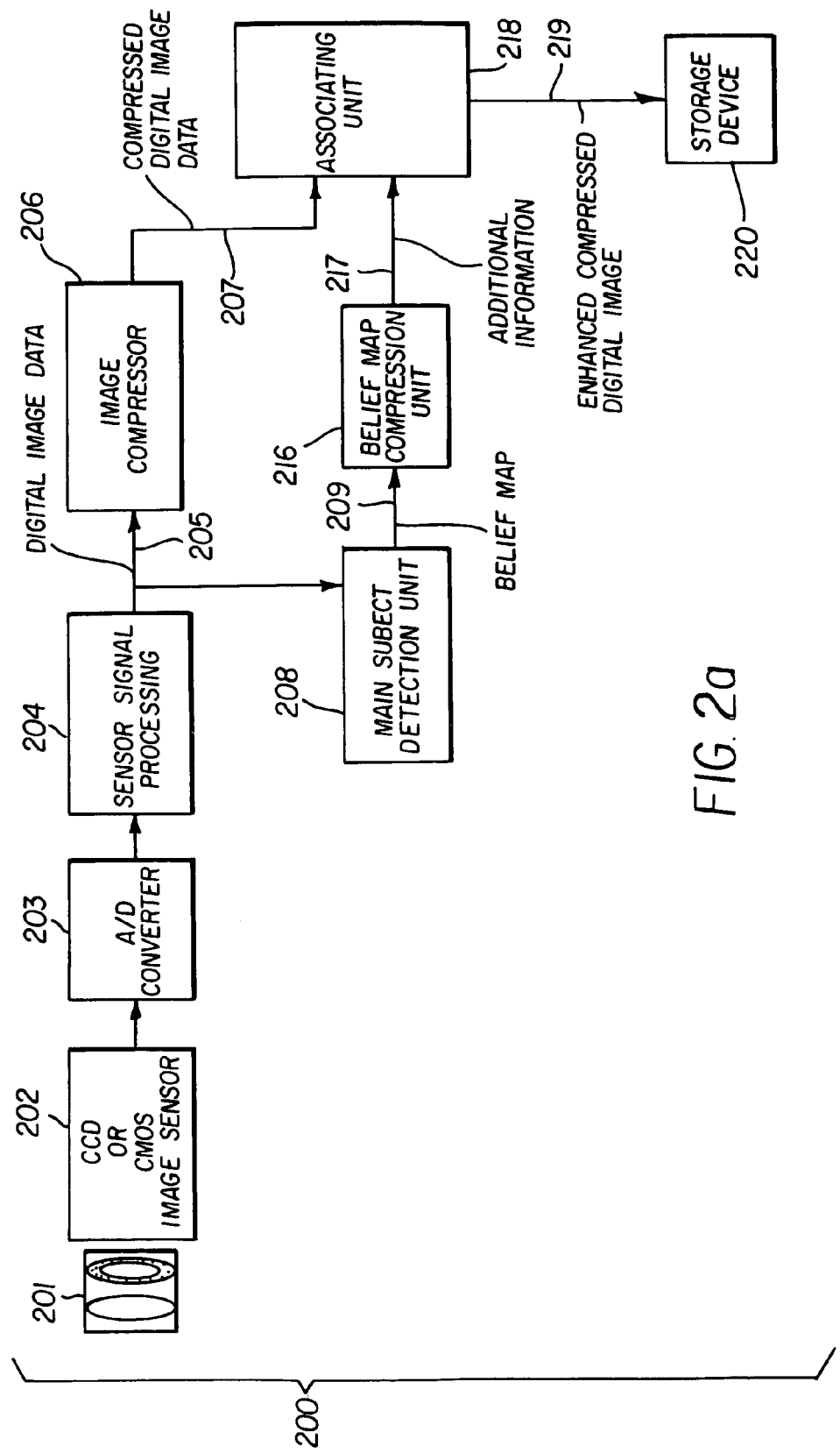
FIG. 2a is a block diagram of an image capture device incorporating one embodiment of the present invention.

FIG. 2a is a simplified block diagram of a camera 200 useful for practicing the present invention. An imager 202, which can be a CCD or CMOS image sensor or equivalent, records the scene information through the lens/iris assembly 201 at its native resolution. Depending on the design, the image data may be read at full resolution or sub-sampled according to the capability of the image sensor 202. Analog image signals are converted to digital data by an analog-to-digital converter (A/D) 203. The digitized data is next processed by sensor signal processing operation 204 to produce digital image data 205 that consists of three separate color image records with the proper resolution, color space encoding, and bit-depth. The resulting data is compressed by an image compressor 206 to produce compressed digital image data 207.

During capture, other processes generate additional information relating to the importance of the photographed subject and corresponding background regions of the digital image data 205 to facilitate future transcoding of the compressed digital image data 207. A main subject detection unit 208, operating on processed digital image data 205, generates a belief map 209 that provides a measure of the relative importance of different regions in the image, such as subjects and background. The method used by the main subject detection unit 208 for calculation of belief map 209 can be, for example, similar to the one described in U.S. Pat. No. 6,282,317, entitled "Method For Automatic Determination Of Main Subjects In Photographic Images," by Luo et al., Aug. 28, 2001, and summarized below.

Once the belief map 209 is computed, it is compressed by a belief map compression unit 216 to generate additional information 217. The form, numerical precision, and spatial resolution of the belief map data depends on a variety of factors, such as the allowable increase in bit-rate caused by combining it with the image data, the type of image compression algorithm a transcoder is expected to employ, etc. For example, if the likely transcoding involves a DCT compression scheme, then the belief map resolution need not be greater than the anticipated block resolution, since any local compression adjustments, such as locally adaptive coefficient quantization, would be on a block-by-block basis. If the likely transcoding involves JPEG2000, as described in Information Technology—JPEG2000 Image Coding System, ISO/IEC International Standard 15444-1, ITU Recommendation T.800, 2000, it is adequate to compute the belief value for each sub-band coefficient, and then store an average belief value for each codeblock in each sub-band.

The additional information 217 is associated with compressed digital image data 207 by an associating unit 218 to form an enhanced compressed digital image 219. In a preferred embodiment, the associating unit 218 combines the compressed digital image data 207 and the additional information 217 in a single file to form an enhanced compressed digital image 219. Those skilled in the art will readily realize that there are other ways of associating the compressed image data 207 with the additional information 217. For example, the enhanced compressed digital image 219 may contain the compressed digital image data 207 and a pointer to a separate file or location where the additional information 217 may be stored. In a preferred embodiment, the enhanced compressed digital image 219 is stored in a storage device 220 such as solid-state removable memory or magnetic tape. Those skilled in the art will readily recognize that instead of storing the enhanced compressed digital image 219, it may directly be transmitted over the network. Those skilled in the art will also recognize that if audio information is captured along with the digital image, compressed audio data can be synchronized and multiplexed with the compressed digital image data 207.

Main subject detection unit 208 provides a measure of saliency or relative importance for different regions that are associated with different subjects in an image in the form of a belief map 209. The belief map 209 is produced by assigning continuum of belief values to pixels in an image. Conventional wisdom in the field of computer vision, which reflects how a human observer would perform such tasks as main subject detection and cropping, calls for a problem-solving path via object recognition and scene content determination according to the semantic meaning of recognized objects.

With respect to the present invention, the main subject detection unit 208 is built upon mostly low-level vision features with semantic information integrated whenever available. This main subject detection unit 208 has a number of sub-tasks, including region segmentation, perceptual grouping, feature extraction, and probabilistic reasoning. In particular, a large number of features are extracted for each segmented region in the image to represent a wide variety of visual saliency properties, which are then input into a tunable, extensible probability network to generate a belief map containing a continuum of values.

Using main subject detection, regions that belong to the main subject are generally differentiated from the background clutter in the image. Thus, selective emphasis of main subjects or de-emphasis of background becomes possible. Automatic subject emphasis is a nontrivial operation that was considered impossible for unconstrained images, which do not necessarily contain uniform background, without a certain amount of scene understanding. In the absence of content-driven subject emphasis, conventional systems rely on a manually created mask to outline where the main subject is. This manual procedure is laborious and has been used in movie production studios. However, it is not feasible to use a manual procedure for consumers' images.

Figure 2B:
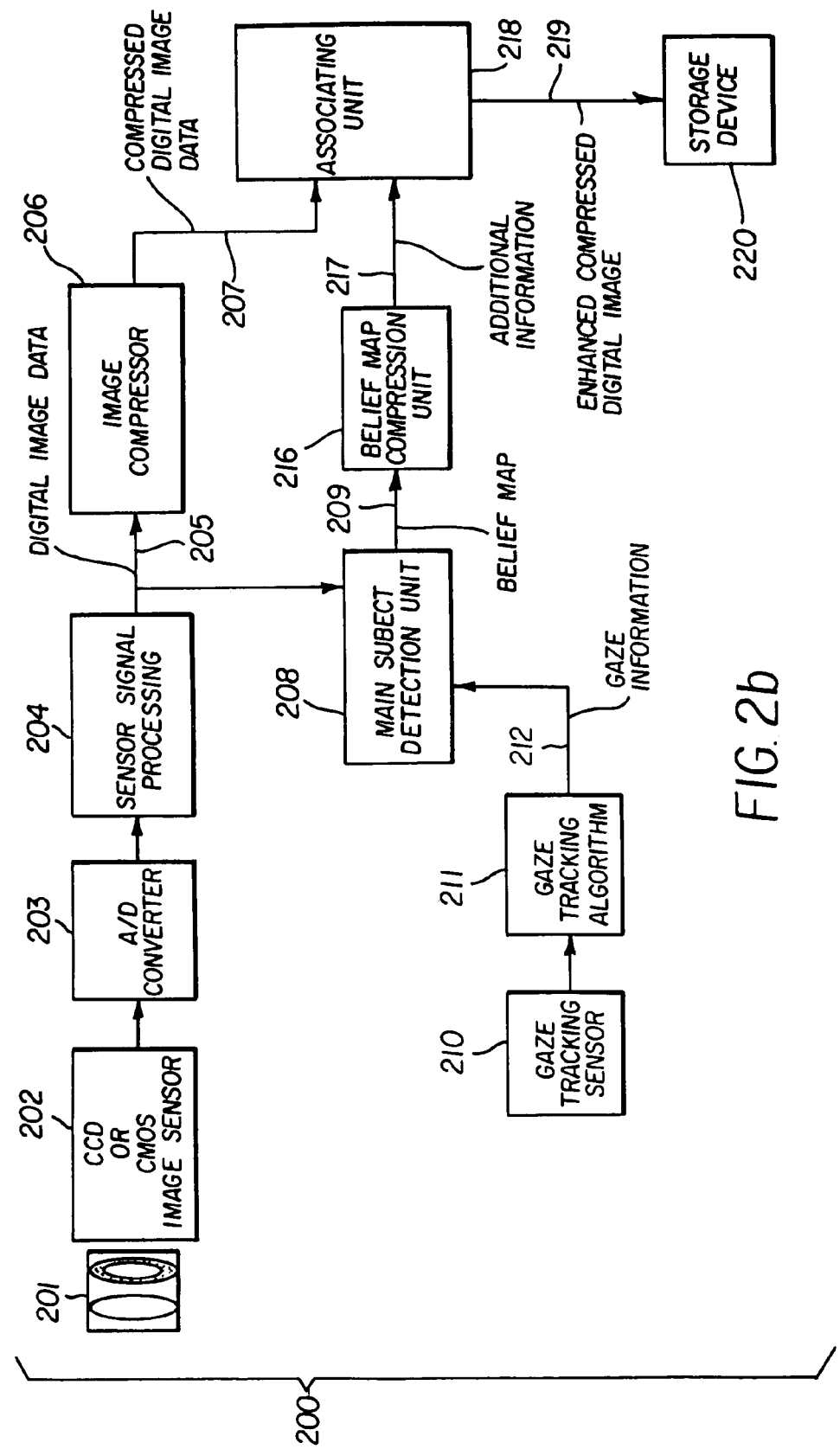
FIG. 2b is a block diagram of an image capture device incorporating another embodiment of the present invention.
Figure 2C:
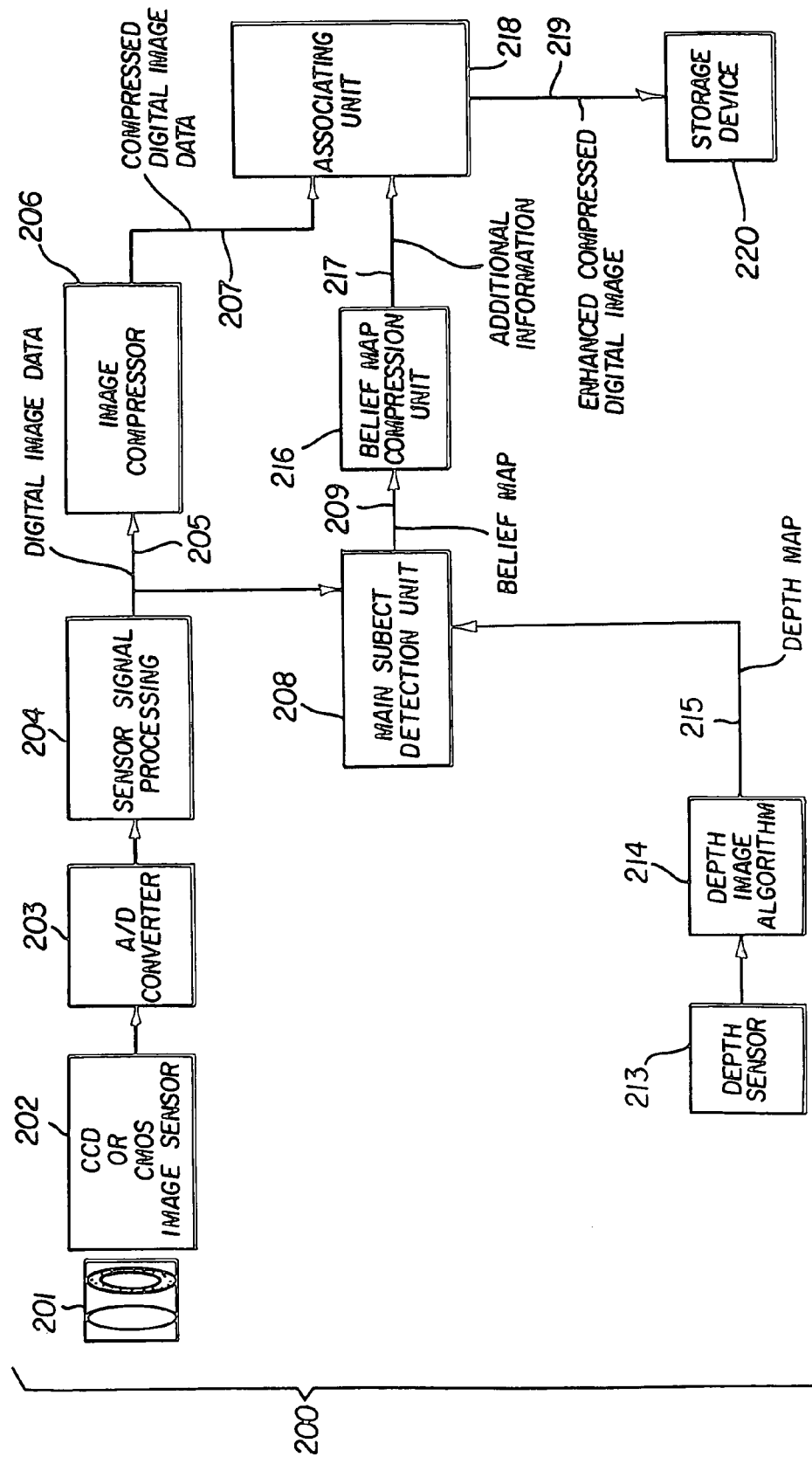
FIG. 2c is a block diagram of an image capture device incorporating another embodiment of the present invention.
Figure 3:
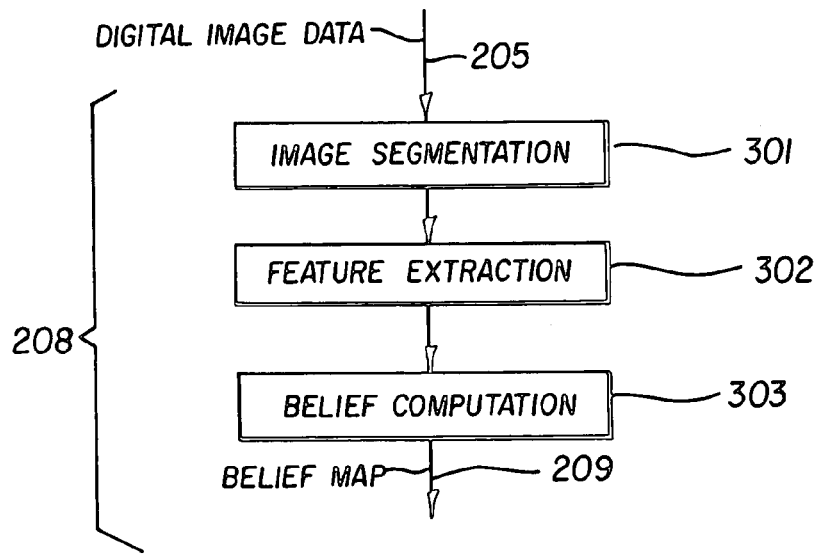
FIG. 3 is a block diagram of a main subject detection unit.

Referring to FIG. 3 and main subject detection unit 208, shown in FIGS. 2a–2c, digital image data 205 is segmented into a few regions of homogeneous properties, such as color and texture by the image segmentation unit 301. The regions are evaluated for their saliency in terms of two independent but complementary feature types: structural features and semantic features by the feature extraction unit 302. For example, a recognition of human skin or faces is semantic while a determination of what is prominent on a face, generically, is categorized as structural. Respecting structural features, a set of low-level vision features and a set of geometric features are extracted. Respecting semantic features, key subject matter frequently seen in photographic pictures are detected. The evidences from both types of features are integrated using a Bayes net-based reasoning engine in a belief computation step 303, to yield the final belief map 209 of the main subject. For reference on Bayes nets, see J. Pearl, *Probabilistic Reasoning in Intelligent Systems*, Morgan Kaufmann, San Francisco, Calif., 1988.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so called gold-partition positions or rule of thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{MSD\_Location}(x, y) \qquad \text{(Equation 1)}$$

where (x,y) denotes a pixel in the region R, $N_R$ is the number of pixels in region R.

If the orientation is unknown, the PDF is symmetric about the center of the image in both vertical and horizontal directions, which results in an orientation-independent centrality measure. If the orientation is known, the PDF is symmetric about the center of the image in the horizontal direction but not in the vertical direction, which results in an orientation-dependent centrality measure.

Another structural feature is borderness. Many background regions tend to contact one or more of the image borders. Therefore, a region that has significant amount of its contour on the image borders is more likely to belong to the background than to the main subject. Two measures are used to characterize the borderness of a region. They include the number of image borders that a region intersects (hereinafter "borderness$_1$") and the percentage of a region's perimeter along the image borders (hereinafter "borderness$_2$").

When image orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: (1) none, (2) one border, (3) two borders, (4) two facing borders, (5) three borders, or (6) four borders that the region contacts. The greater the contact a region has with a border, the greater the likelihood that the region is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the region is in contact with. Using the definition of "in contact with" from above, the four borders of the image are labeled as "Top," "Bottom," "Left," and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would mean the region has a negative area, or a portion of the region exists outside the image area, which would be unknown for any arbitrary image. Since such a fraction cannot exceed one-half, the following definition is used to normalize the feature value to a range from zero to one.

$$Borderness_2=2\times(number\_of\_region\_perimeter\_pixels\_on\_image\_border)/(number\_of\_region\_perimiter\_pixels) \quad \text{(Equation 2)}$$

One of the semantic features is human skin. According to a study of a photographic image database of over 2000 images, over 70% of the photographic images have people and about the same number of images have sizable faces in them. Thus, skin tones are common in images. Indeed, people are the single most important subject in photographs. Therefore, an algorithm that can effectively detect the presence of skin tones is useful in identifying the main subject of an image.

In the present invention, the skin detection algorithm utilizes color image segmentation and a pre-determined skin distribution in a specific chrominance space, as: P(skin|chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance. For reference see Lee, "Color image quantization based on physics and psychophysics," Journal of Society of Photographic Science and Technology of Japan, Vol. 59, No. 1, pp. 212–225, 1996. The skin region classification is based on maximum probability according to the average color of a segmented region, as to where if falls within the predefined chrominance space. However, the decision as to whether a region is skin or not is primarily a binary one. Utilizing a continuum of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task is to determine the likelihood of a given region in the image being the main subject based on the posterior probability of:

$$P(\text{main subject detection}|\text{feature}) \quad \text{(Equation 3)}$$

In an illustrative embodiment of the present invention, there is one Bayes net active for each region in the image. Therefore, the probabilistic reasoning is performed on a per region basis (instead of per image).

In an illustrative embodiment, the output of main subject detection unit 208, shown in FIG. 2a, is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map 209. Because of the continuum of belief values employed in the belief map 209, the belief map 209 is more than a binary map that only indicates location of the determined main subject. The associated likelihood is also attached to each region so that the regions with large values correspond to regions with higher confidence, or belief, that they are part of the main subject.

To some extent, this belief map 209 reflects the inherent uncertainty for humans to perform such a task as main subject detection because different observers would likely disagree on certain subject matter while agreeing on other subject matter in terms of which are main subjects. This illustrates a problem in binary main subject determinations. The subjective perception of each observer influences the apparent accuracy of the main subject detection algorithm. It is therefore impossible to detect the main subject with total accuracy because the opinion about what constitutes a main subject varies from observer to observer. However, a binary decision, when desired, can be readily obtained by using an appropriate threshold on the belief map 209, where regions having belief values above the threshold are arbitrarily defined as main subjects and those below the threshold are arbitrarily defined as background regions.

There may be other information relating to the importance of the photographed subject and corresponding background regions of the digital image that can be used by the main subject detection unit 208 to refine the belief map 209. For example, a further improvement can be achieved by including separate sensors either within the image capture device 101 of FIG. 1 or electrically connected, but outside of the image capture device 101 of FIG. 1. For example, significant progress has been made in the cost and performance of sensors that can be incorporated into a viewfinder to track the gaze of the photographer. Such sensors are currently used, for example, to improve automatic focus by estimating the location of the subject in the viewfinder image and tracking where the photographer is looking in the viewfinder field.

Another embodiment of the invention is shown in FIG. 2b. Referring to FIG. 2b, information from a gaze tracking sensor 210 is processed by a gaze tracking algorithm 211 to provide gaze information 212 based on the user's gaze during or near the time of capture. In a preferred embodiment, the gaze information 212 is in the form of a gaze center $(x_g, y_g)$ where the user's gaze was centered at the time of capture. The gaze center can be thought of as providing information regarding the main subject and the background regions from the point of view of the photographer.

The gaze information 212 is used to replace the centrality measure as a structural feature in the feature extraction step 302 of the main subject detection unit 208 in FIG. 3. After the image segmentation step 301, in FIG. 3, for each region or segment of the image a "gaze measure" is calculated. The gaze measure for region R is defined as $$gaze_R = \frac{1}{N_R} \sum_{(x,y) \in R} \left((x_g - x)^2 + (y_g - y)^2\right), \quad \text{(Equation 4)}$$

where (x,y) denotes a pixel belonging to region R and $N_R$ is the total number of pixels in region R. It will be obvious to people skilled in the art that it is possible to use the gaze information 212 as an additional structural feature instead of replacing the centrality measure in the feature extraction step 302.

There also have been improvements in imaging devices that can determine the distance to subjects. These imaging devices produce a "depth map" of the scene according to their own spatial and distance resolution. In another embodiment of the invention, as shown in FIG. 2c, information from a depth sensor 213 is processed by a depth imaging algorithm 214 to produce a depth map 215. Let the depth at pixel location (x,y) be denoted by d(x,y). The resolution of the depth map may be lower than that of the image. For example, only a single depth value may be produced for a 2×2 block of image pixels. In such a case, the depth at the full resolution is obtained by pixel replication. In a preferred embodiment, the depth map 215 is fed to the main subject detection unit 208 to further improve the belief map 209 as follows. The depth map 215 provides information regarding the relative importance of various regions in the captured scene. For example, regions having smaller depth values are more likely to be main subject regions. Similarly, regions with high depth values are more likely to be background regions. After the segmentation step 301, as shown in FIG. 3, the depth map 215 is used to derive a "depth measure" for each region or segment of the image. The depth measure is used as an additional structural feature in the feature extraction step 302 of the main subject detection unit 208 in FIG. 3. The depth measure is defined as $$depth_R = \frac{1}{N_R} \sum_{(x,y) \in R} d(x, y). \quad \text{(Equation 5)}$$

It should be understood that it is not necessary for the main subject detection unit 208 to utilize any additional data sources such as the gaze tracking algorithm 211 or the depth image algorithm 214 to practice the present invention. Any or all of these data sources can be useful for improving the belief map 209. For example, the main subject detection unit 208 need only utilize digital image data 205.

It should also be understood that the additional data sources such as the gaze tracking sensor 210 and the depth sensor 213 are not required to be contained within the digital image capture device 101 of FIG. 1. For example, the depth sensor 213 and the depth image algorithm 214 could be contained in a device external to the digital image capture device 101. Such an arrangement might be more appropriate for cinematographic application, in which data from highly specialized image and data capture devices are captured separately. It is also understood that the digital image capture device 101, as shown in FIG. 1, may capture a motion sequence, that is, a sequence of images. In a preferred embodiment, each frame of the motion sequence is compressed separately and combined with its corresponding belief map to form an enhanced compressed motion sequence data. Those skilled in the art will readily recognize that it is possible to compress a group of frames from the motion sequence using MPEG or H.263 or any other video compression algorithm that uses motion estimation between frames to improve compression efficiency.

If the enhanced compressed digital image 219 is to be decoded for viewing on a device capable of handling the bit-rate of the digital image or motion sequence, then the decoder can be instructed to ignore the additional information contained in the enhanced compressed digital image 219. If however, the image or motion image sequence needs to be transmitted over a channel of insufficient bandwidth to carry the digital image or motion sequence, then a specialized transcoder that utilizes the additional information to recompress the compressed digital image to a lower bit-rate is used.

Figure 4:
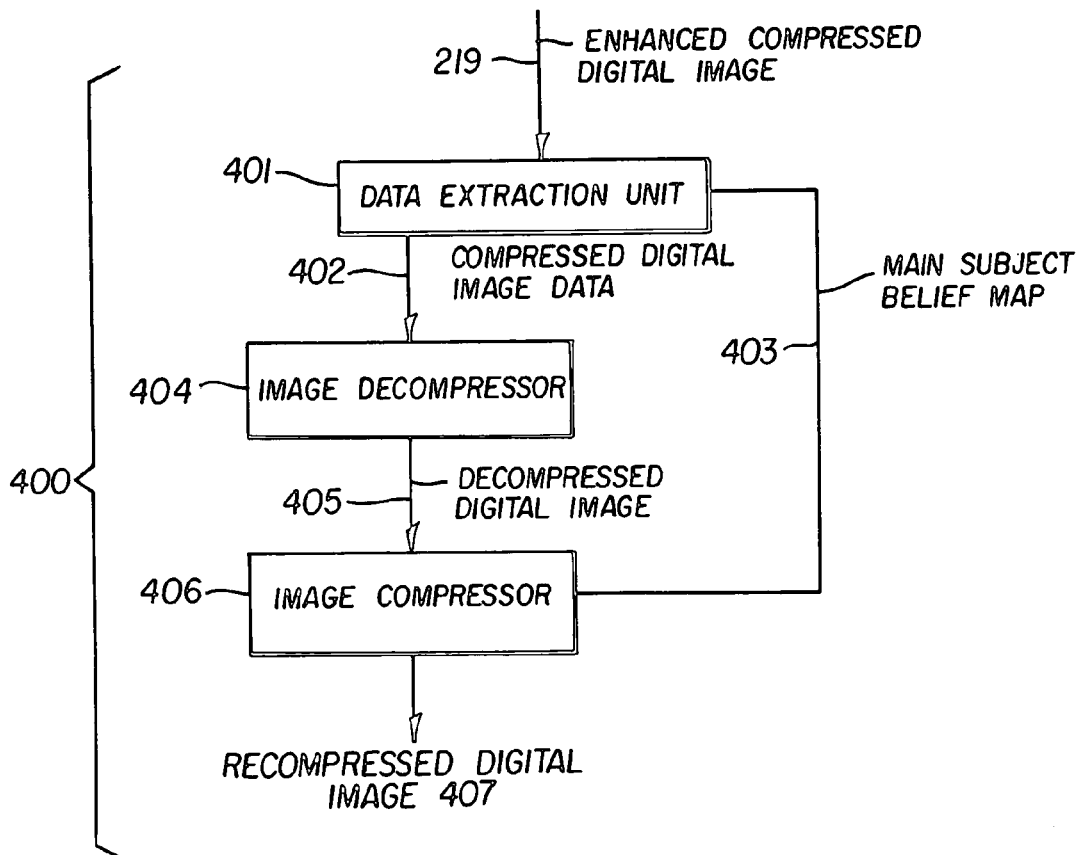
FIG. 4 is a block diagram of one embodiment of a transcoder for the present invention.

FIG. 4 illustrates a transcoder 400. The enhanced compressed digital image 219, shown in FIGS. 2a–2c, is fed to a data extraction unit 401. The data extraction unit 401 extracts the compressed digital image data 402 and additional information in the form of a main subject belief map 403 from the enhanced compressed digital image 219. It may be necessary to extract the compressed digital image data 402 and the main subject belief map 403 from separate and distinct files or locations. In a preferred embodiment, the main subject belief map is in a compressed form. The compressed digital image data 402 is decompressed by image decompressor 404 to form a decompressed digital image 405. The decompressed digital image 405 is recompressed to a lower bit-rate by the image compressor 406 responsive to the main subject belief map 403, to generate a recompressed digital image 407. In a preferred embodiment, the image compressor 406 used by the transcoder 400 is a JPEG2000 encoder and the additional information is in the form of a main subject belief map. The method for recompressing the decompressed digital image 405 responsive to the main subject belief map can be, for example, similar to the one described in U.S. patent Ser. No. 09/898, 230, entitled, "A Method For Utilizing Subject Content Analysis For Producing A Compressed Bit Stream From A Digital Image," filed Jul. 3, 2001, by Joshi, et al., and is summarized below.

Figure 5:
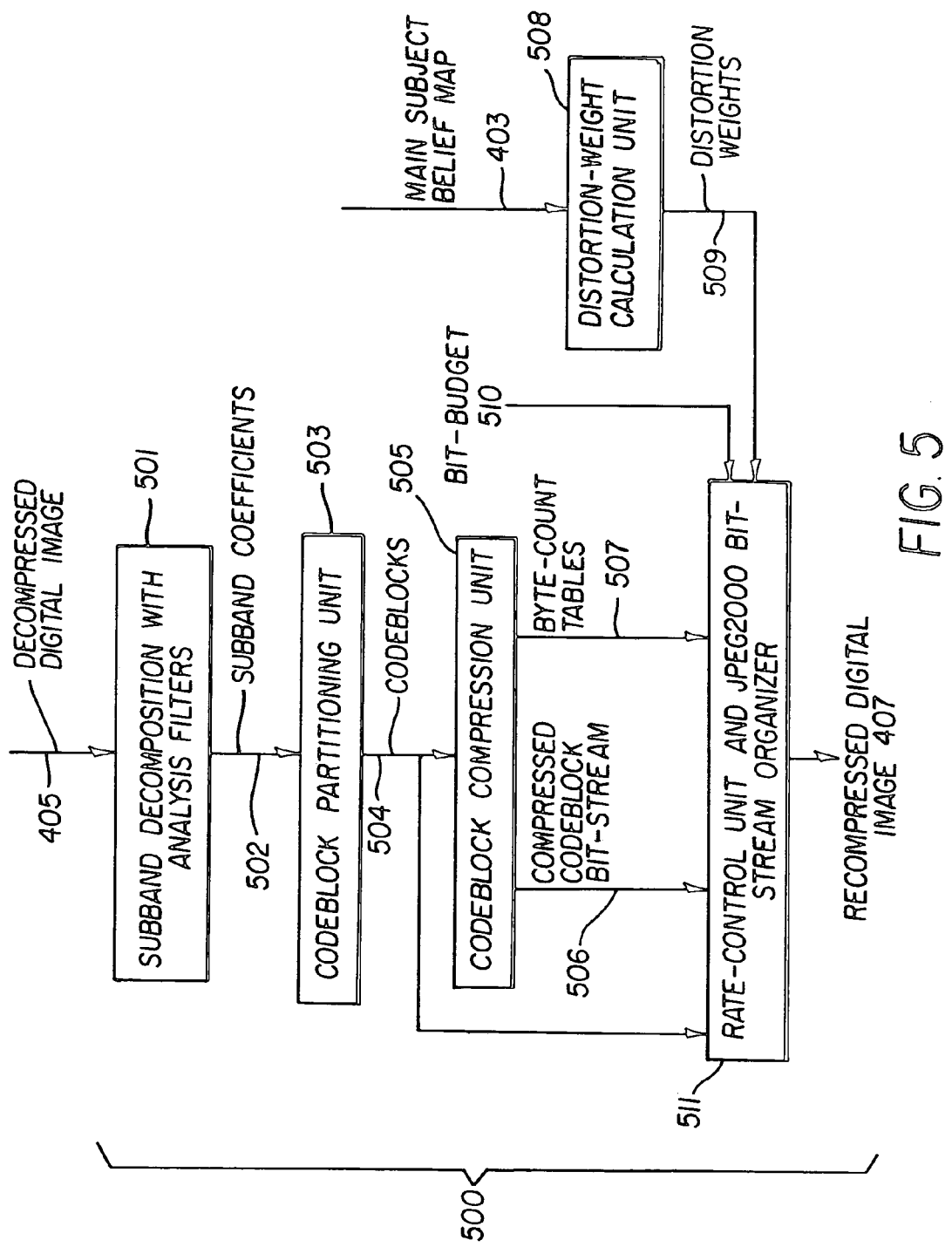
FIG. 5 is a block diagram of one embodiment of an image compressor used in a transcoder for to the present invention.

FIG. 5 shows a flow chart for a JPEG2000 image encoder 500 that recompresses a decompressed digital image 405, responsive to the main subject belief map in the form of a main subject belief map 403. The JPEG2000 Part I international standard, as described in "Information Technology—JPEG2000 Image Coding System, ISO/IEC International Standard 15444-1, ITU Recommendation T.800, 2000" specifies how a JPEG2000 compliant bit-stream is interpreted by a JPEG2000 decoder. This imposes certain restrictions on the JPEG2000 encoder. But, the JPEG2000 bit-stream syntax is very flexible so that there are a number of ways in which a JPEG2000 encoder can optimize the bit-stream.

FIG. 5 illustrates one such method for optimizing the bit-stream for a given bit-rate in accordance with the main subject belief map 403. The decompressed digital image 405 undergoes sub-band decomposition 501 by the analysis filters to produce an image representation in terms of sub-band coefficients 502. The sub-band coefficients 502 are partitioned into one or more rectangular blocks by the codeblock partitioning unit 503 to produce one or more codeblocks 504. Each codeblock is compressed by the codeblock compression unit 505 using the appropriate quantizer step-size to produce a compressed codeblock bit-stream 506 and a byte-count table 507. The distortion-weight calculation unit 508 uses the main subject belief map 403 to derive the distortion-weights 509 that are used by a subsequent rate-control algorithm. The codeblocks 504, compressed codeblock bit-stream 506, byte-count table 507, a bit budget 510, and distortion-weights 509 are input to the rate-control unit and JPEG2000 bit-stream organizer 511, which produces the recompressed digital image 407.

The blocks in FIG. 5 will now be described in greater detail. The JPEG2000 encoder uses a wavelet decomposition, which is a special case of a subband decomposition 501. Consider the wavelet decomposition of a one-dimensional signal x[n]. This is accomplished by filtering with analysis filters, $h_0[n]$ and $h_1[n]$, and down-sampling by a factor of 2 to produce sub-band signals $x_0[n]$ and $x_1[n]$. This process can be repeated on the low-pass sub-band, $x_0[n]$, to produce multiple levels of wavelet decomposition. Up-sampling the sub-band signals, $x_0[n]$ and $x_1[n]$, by a factor of 2 and filtering with synthesis filters, g0[n] and g1[n], the original signal x[n] can be recovered from the wavelet coefficients in the absence of quantization. The wavelet decomposition of The input signal x[n] can be expressed as a linear combination of the synthesis basis functions. Let $\Psi_m^1[n]$ denote the basis function for coefficient $x_1[m]$, the $m^{th}$ coefficient from subband i. Then, $$x[n] = \sum_i \sum_m x_i[m] \Psi_m^i[n] \qquad \text{(Equation 6)}$$

The simplest way to determine the basis functions is as follows. For determining the basis function for coefficient $x_1[m]$, the coefficient value is set to one, and all other coefficients from that sub-band as well as other sub-band are set to zero. Then, the image reconstructed by synthesizing the sub-band is the basis function $\Psi_m^1[n]$ corresponding to sub-band coefficient $x_1[m]$. Since the basis functions for other coefficients from the same band are shifted versions of $\Psi_m^1[n]$, this calculation needs to be done only once for each subband. In two dimensions, let the original image be represented as I(u,v), where u and v represent the row index and column index, respectively. Then, $$I(u,v) = \sum_i \sum_{g,h} x_i(g,h) \Psi_{g,h}^i(u,v) \qquad \text{(Equation 7)}$$

where $x_1(g,h)$ refers to the subband coefficient from subband i, with g and h referring to the row and column index of that coefficient, respectively.

The region of support of a basis function is defined as all the pixels for which the basis function has a non-zero value. For a two-dimensional separable filter-bank, the region of support for a basis function is guaranteed to be rectangular. Thus, the region of support in the row and column direction can be determined separately. The Cartesian product of the two regions of supports is the region of support for the two-dimensional basis function.

The codeblock partitioning unit 503 partitions each sub-band into one or more rectangular codeblocks. Each codeblock is compressed by the codeblock compression unit 505. Each codeblock is quantized with a dead-zone scalar quantizer using the appropriate quantizer step-size to produce a sign-magnitude representation of the indices of the quantized coefficients. Quantized wavelet coefficients from each codeblock are independently encoded by an entropy coder (not shown). The entropy coder encodes the bit-planes of the sign-magnitude representation of the codeblock coefficients using MQ arithmetic coder. Each bit-plane, except the first non-zero bit-plane in a codeblock, is coded in 3 coding passes, namely significance propagation pass, magnitude refinement pass, and cleanup pass. The first non-zero bit-plane of a codeblock is coded using only the cleanup pass. The codeblock partitioning unit 503 produces compressed codeblock bit-stream 506 for each codeblock 504. It also produces a byte-count table 507 for each codeblock 504. The $p^{th}$ entry in the table corresponds to the number of bytes needed to include the first p coding passes from that codeblock 504 in the compressed codeblock bit-stream 506.

The rate-control algorithm used in operation 511 is a modified version of the method used by the EBCOT algorithm, as described in D. Taubman, "High performance scalable compression with EBCOT," *IEEE Transactions on Image Processing*, 9(7), pp. 1158–1170 (July 2000). Let the total number of codeblocks for the entire image be P. Let the codeblocks be denoted by $B_s$, $1 \leq s \leq P$. Let the compressed bit-stream corresponding to codeblock $B_s$ be denoted by $C_s$. Typically, for each codeblock, the compressed data included in the final bit-stream is a truncated version of the initial compressed bit-stream. The potential truncation points for compressed bit-stream $C_s$ are nominally the boundaries of the coding passes. Let the possible truncation points for codeblock $B_s$ be denoted by $T_s^z$, $1 \leq z \leq N_s$, where $N_s$ denotes the number of possible truncation points for the compressed bit-stream $C_s$. Let the size of the truncated bit-stream corresponding to truncation point $T_s^z$ be $R_s^z$ bytes. With each truncation point $T_s^z$, we can also associate a distortion $D_s^z$. The distortion quantifies the error between the original image and the reconstructed image, if the compressed codeblock is truncated after $R_s^z$ bytes. In general, if the distortion measure is weighted mean squared error (MSE), the distortion can be specified as $$D_s^z = \|\varphi_i\|^2 \sum_{(g,h)} w_i(g,h)(\hat{x}_i^z(g,h) - x_i(g,h))^2 \qquad \text{(Equation 8)}$$

where the summation is over all coefficients in codeblock $B_s$. The original codeblock coefficients are denoted by $x_1(g,h)$. Here we have assumed that block $B_s$ is from sub-band i. $\hat{x}_1(g,h)$ refers to codeblock coefficients reconstructed from the first $R_s^z$ bytes of the compressed bit-stream $C_s$. $\|\phi_i\|$ is the $L_2$ norm of the basis function associated with any coefficient from sub-band i. It should be noted that all the coefficients from a single sub-band have the same $L_2$ norm.

The squared error for coefficient $x_1(g,h)$ is weighted by the distortion-weighting factor $w_1(g,h)$. The distortion-weighting factor is derived from the main subject belief map 403, here, a main subject belief map 209 as in FIG. 2. The distortion-weight calculation unit 508 derives the distortion-weighting factor $w_1(g,h)$ for each sub-band coefficient from the main subject belief map 209. This is far from obvious because the distortion-weighting factor $w_1(g,h)$ determines the visual weighting for a coefficient in the sub-band domain, whereas the main subject belief map 209 is in the image domain.

Previously, we described how to calculate the basis function corresponding to a specific sub-band coefficient. This basis function can be used to derive the distortion weighting for that sub-band coefficient. As before, let $\Psi_{gh}^1(u,v)$ denote the basis function corresponding to the sub-band coefficient $\hat{x}_1(g,h)$ from sub-band i. Let the sub-band coefficient be quantized and let the reconstruction value be $\hat{x}_1(g,h)$. Then, the reconstructed value can be represented as the sum of the original coefficient and a quantization error $e_1(g,h)$, $$\hat{x}_1(g,h) = x_1(g,h) + e_1(g,h) \qquad \text{(Equation 9)}$$

Since the synthesis operation is linear, the distortion in the reconstructed image due to the quantization error $e_1(g,h)$ in sub-band coefficient $x_1(j,k)$ is $$e(u,v) = e_1(g,h) \Psi_{gh}^1(u,v) \qquad \text{(Equation 10)}$$

If we assume that the perceived distortion at a particular pixel location (u,v) is a function of the main subject belief value at that pixel location, the perceived distortion in the reconstructed image due to quantization of the sub-band coefficient $x_1(g,h)$ is $$\sum_{u,v} e^2(u, v) G(p(u, v))$$ (Equation 11)

or $$e_i^2(g, h) \sum_{u,v} (\Psi_{gh}^i(u, v)^2) G(p(u, v))$$

where p(u,v) denotes the main subject belief map value, G is a function of the belief value at that particular location, and the summation is over the support region for the basis function $\Psi_{gh}^1$. Thus, the distortion-weighting factor for sub-band coefficient $x_1(g,h)$ is $$w_i(g, h) = \sum_{u,v} (\Psi_{gh}^i(u, v))^2 G(p(u, v))$$ (Equation 12)

Once the distortion-weight 509 for each sub-band coefficient has been calculated, the rate-distortion optimization algorithm, as described in Y. Shoham and A. Gersho, "Efficient bit allocation for an arbitrary set of quantizers," *IEEE Transactions on Acoustics, Speech, and Signal Processing*, 36(9), pp. 1445–1453, (September 1988) can be applied to determine the truncation point for each codeblock subject to a constraint on the total bit-rate. A person skilled in the art will readily recognize that the performance of the rate-control algorithm will be dependent on the quality of the decompressed digital image 405. If the initial compression ratio is small, the decompressed digital image 405 will be a good approximation of the original image 205. Hence, the distortion estimation step will be fairly accurate.

Figure 6:
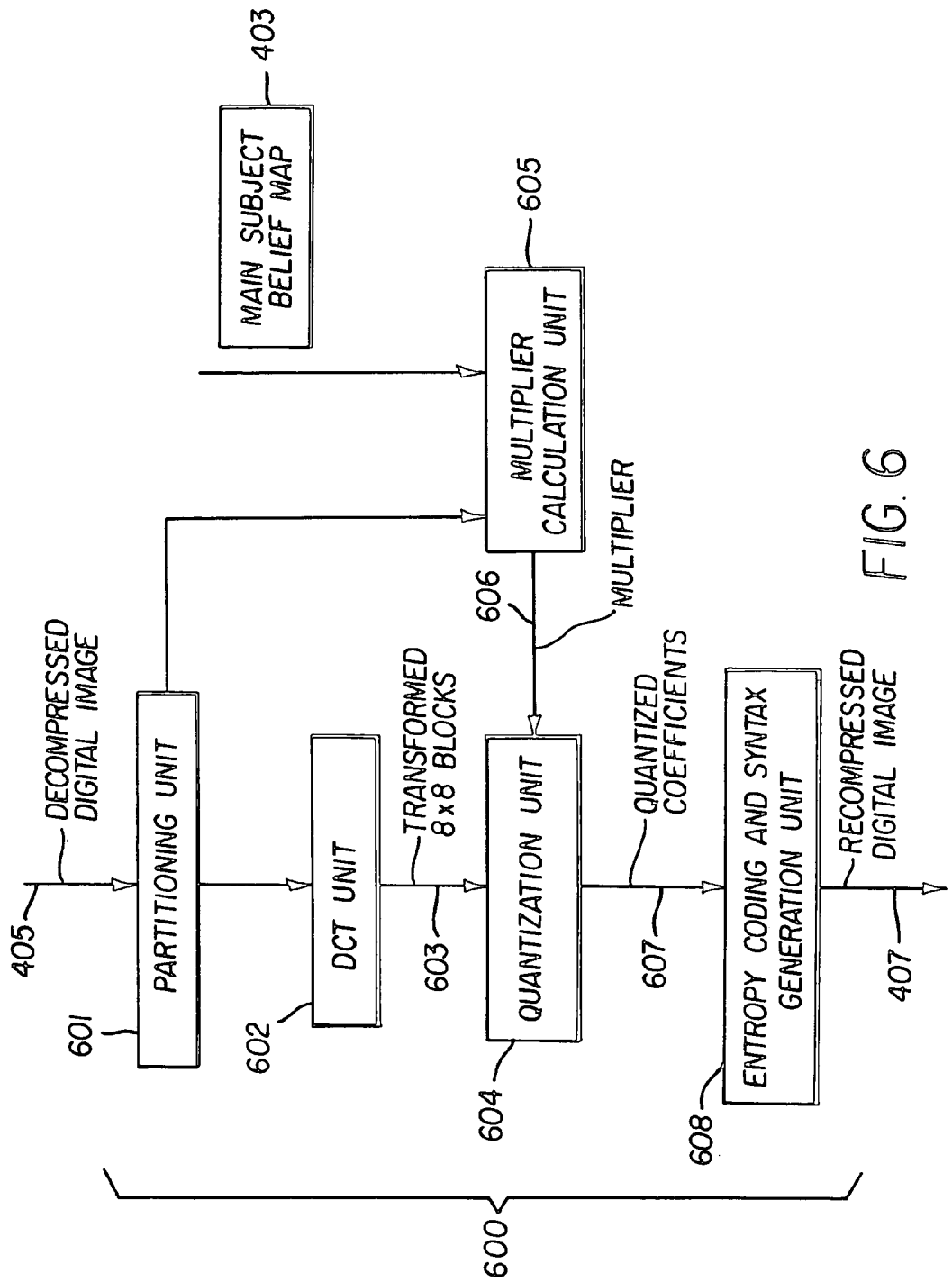
FIG. 6 is a block diagram of another embodiment of an image compressor used in a transcoder for the present invention.

FIG. 6 shows another embodiment of the transcoder 400 in which the image compressor 406, shown in FIG. 4, and used by the transcoder 400 is a transform coder 600 based on an extension to the JPEG standard as described in ISO/IEC International Standard 10918-3. The transform coder 600 uses the main subject belief map 403 for spatially adaptive quantization. The extension to the JPEG standard allows specification of a quantizer matrix as described in W. B. Pennebaker and Joan L. Mitchell, *JPEG Still Image Data Compression Standard*, Van Nostrand Reinhold, New York 1993. In addition, for each 8×8 block, the extension allows the specification of a multiplier, which scales the quantization matrix. In another embodiment of the invention, the multiplier for each 8×8 block is varied depending on the average of the main subject belief value for the block as shown in FIG. 6.

Referring to FIG. 6 in greater detail, the decompressed digital image 405 is partitioned into 8×8 blocks by the partitioning unit 601. The main subject belief map 209 is fed to a multiplier calculation unit 605, which calculates the average of the main subject belief values for each 8×8 block and uses the average value to determine the multiplier 606 for that 8×8 block. The JPEG-extension allows two pre-specified tables for multiplier values (linear or non-linear). In a preferred embodiment, the linear table is used. For the linear table, the entries range from ($\frac{1}{16}$) to ($\frac{31}{16}$) in increments of ($\frac{1}{16}$). Since the average of belief values for an 8×8 block is between 0 and 1, in a preferred embodiment, the multiplier is determined as $$\text{multiplier} = \frac{\lfloor (1.0 - \text{average}) \times 32.0 \rfloor}{16}$$ (Equation 13)

where average represents the average belief value for the 8×8 block and $\lfloor x \rfloor$ represents the greatest integer less than or equal to x. The resulting multiplier value is clipped to the range [$\frac{1}{16}$, $\frac{31}{16}$]. As expected, the multipliers for the blocks with lower average belief values are higher, resulting in coarser quantization. Those skilled in the art will recognize that it is possible to use other mapping as long as lower average belief values get mapped to higher multiplication factors. The DCT unit 602 transforms each 8×8 block using two-dimensional discrete cosine transform (2-D DCT) to produce transformed 8×8 blocks 603. The quantization unit 604 quantizes the DCT coefficients using the appropriate quantization matrix and the multiplier 606 supplied by the multiplier calculation unit 605 to produce quantized coefficients 607. Then, the entropy coding and syntax generation unit 608 generates the recompressed digital image 407 that is compatible with the extension to the JPEG standard. Those skilled in the art will recognize that the same approach of varying the quantization based on the average belief value for an 8×8 block can be used to compress intra- and inter-coded 8×8 blocks in MPEG and H.263 family of algorithms for recompressing a motion sequence.

As mentioned previously, when the belief map is compressed at the encoder, the belief map compression unit 216, shown in FIG. 2, anticipates the kind of compression that the decompressed image will undergo at the transcoder 400. For example, in a preferred embodiment, the transcoder 400 uses JPEG2000 compression algorithm; and the belief map compression unit 216 stores the average weighting factor for each codeblock. Similarly, if the transcoder 400 uses JPEG, MPEG or H.263 compression, it is adequate to store a weighting factor for each 8×8 block. This is important because this minimizes the extra memory required to store the additional information without adversely affecting the transcoder operation.

Figure 7:
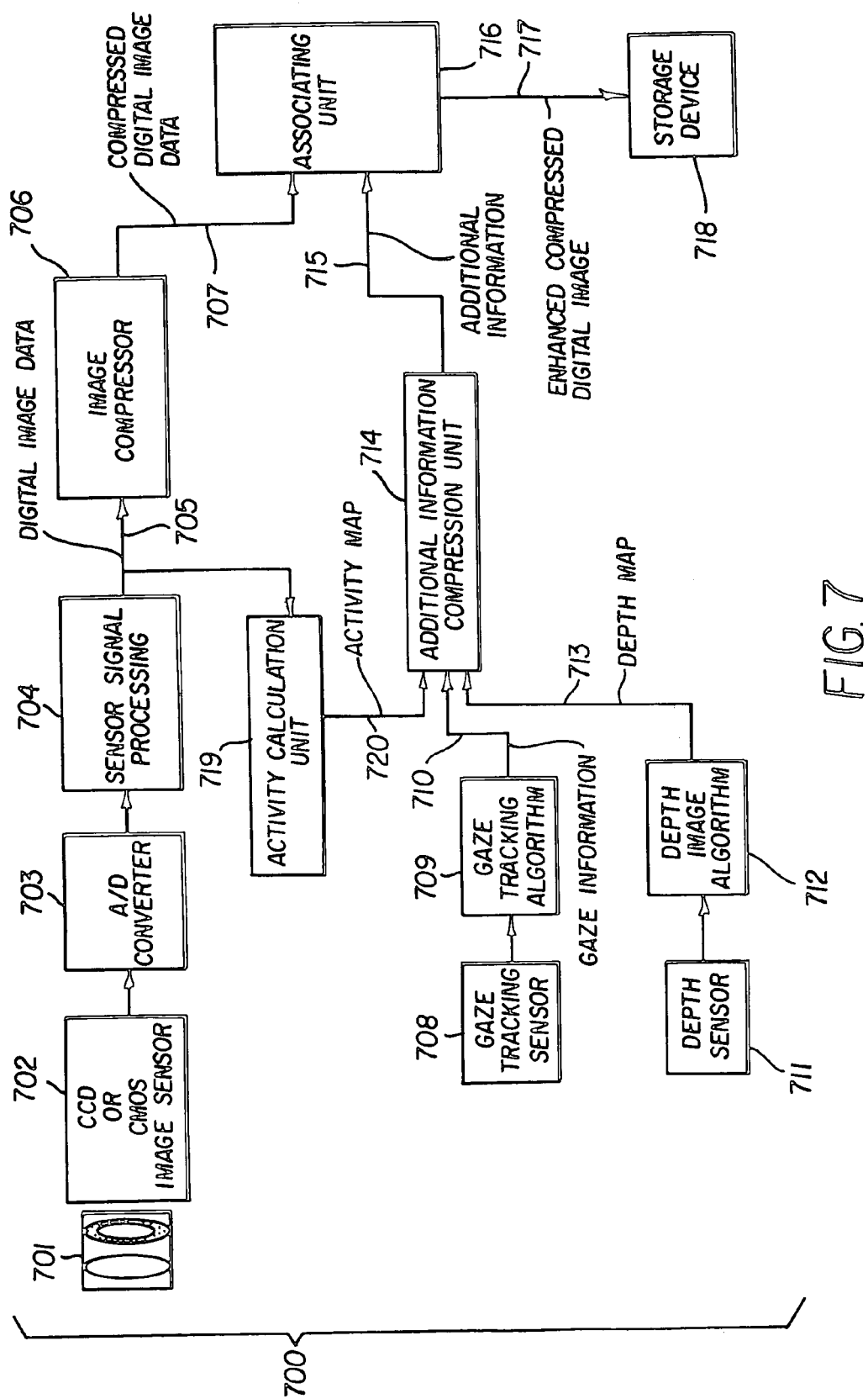
FIG. 7 is a block diagram of an image capture device incorporating another embodiment of the present invention.

There will be some applications where it is more practical to calculate the belief map at the time of transcoding and not at the time of capture. For example, in motion capture applications, it may not be possible to calculate a belief map for each image in the motion sequence at the time of capture. Nonetheless, in such an application it still remains advantageous to generate additional information corresponding to the subject and background regions of the digital image at the time of capture. FIG. 7 illustrates another embodiment of the invention.

An image sensor 702, which can be a CCD or CMOS image sensor or equivalent, records the scene information through the lens/iris assembly 701 at its native resolution. Analog image signals are converted to digital data by an analog-to-digital converter (A/D) 703. The digitized data is next processed by sensor signal processing operation 704 to produce digital image data 705 that consists of three separate color image records with the proper resolution, color space encoding, and bit-depth. The resulting data is compressed by an image compressor 706 to produce compressed digital image data 707.

During capture, other processes generate additional information relating to the importance of the photographed subject and corresponding background regions of the digital image data 705 to facilitate future transcoding of the compressed digital image data 707. A gaze tracking sensor 708 is processed by a gaze tracking algorithm 709 to provide gaze information 710 based on the user's gaze during or near the time of capture. Similarly, a depth sensor 711 captures depth information that is processed by a depth imaging algorithm 712 to produce a depth map 713. Similarly, the digital image data 705 is processed by an activity calculation unit 719 to produce an activity map 720. In a preferred embodiment, the gaze information 710, depth map 713, and activity map 720 are compressed by an additional information compression unit 714 to create additional information 715. As mentioned previously, the form, numerical precision, and spatial resolution of the additional information 715 depends on a variety of factors, such as the allowable increase in bit-rate caused by combining it with the image data, the type of image compression algorithm a transcoder is expected to employ, etc. It is not necessary that the additional information 715 consists of all three components, e.g., the gaze information 710, depth map 713, and activity map 720. Any single component or a combination of components may form the additional information 715.

The additional information 715 is associated with the compressed digital image data 707 by an associating unit 716 to form an enhanced compressed digital image 717. As mentioned before, the compressed digital image data 707 and the additional information 715 may be combined in a single file by the associating unit 716 or they may be in separate files or locations. In that case, the enhanced compressed digital image 717 containing the compressed digital image data 707 also contains a pointer to a separate file or location where the additional information 715 may be stored. In a preferred embodiment, the enhanced compressed digital image 717 is stored in a storage device 718 such as solid-state removable memory or magnetic tape. Those skilled in the art will readily recognize that instead of storing the enhanced compressed digital image 717, it may directly be transmitted over the network. Those skilled in the art will also recognize that if audio information is captured along with the digital image, compressed audio data can be synchronized and multiplexed with the compressed digital image data 707.

The additional information contained in the final enhanced compressed digital image 717 is ignored by a standard encoder for a device capable of handling the digital image bit rate. If however, the image sequence needs to be transmitted over a channel of insufficient bandwidth to carry the digital image or motion sequence, then a transcoder capable of utilizing the additional information and computing a belief map for the still images or sequences would be advantageous. An example of such a low bandwidth transcoder is shown in FIG. 8a.

The enhanced compressed digital image 717, shown in FIG. 7, is fed to a data extraction unit 801. The data extraction unit 801 extracts the compressed digital image 802 and additional information 803 from the enhanced compressed digital image 717. It may be necessary to extract the compressed digital image 802 and additional information 803 from separate and distinct files or locations. In a preferred embodiment, the additional information 803 is in a compressed form. In that case, the data extraction unit 801 also performs the additional step of decompression to extract the additional information 803. The compressed digital image 802 is decompressed by an image decompressor 804 to form a decompressed digital image 805. The additional information 803 and the decompressed digital image 805 are fed to a main subject detection unit 808. The main subject detection unit 808 produces a main subject belief map 809. The method used by the main subject detection unit 808 for calculation of main subject belief map 809 can be, for example, similar to the one described in U.S. Pat. No. 6,282,317, filed Dec. 31, 1998 by Luo et al., and summarized previously. The only difference is that the main subject detection unit operates on decompressed digital image 805. Also, the additional information 803 is used as additional features by the main subject detection unit 808 as described previously. Those skilled in the art will readily realize that for successful performance of the main subject detection unit 808, the decompressed digital image 805 needs to be of a reasonable quality. The decompressed digital image 805 is recompressed to a lower bit-rate by the image compressor 806 responsive to the main subject belief map 809 to generate a recompressed digital image 807. In a preferred embodiment, the image compressor 806 used by the transcoder 800 is a JPEG2000 encoder. The method for recompressing the decompressed digital image 805 responsive to the main subject belief map 809 can be, for example, similar to the one described in U.S. patent application Ser. No. 09/898,230, filed Jul. 3, 2001 by Joshi et al. and summarized previously. If the image or motion sequence compressor 806 utilizes a compression scheme based on the Discrete Cosine Transform such as JPEG, MPEG, and H.263, then those skilled in the art will recognize that the main subject belief map 809 can be used to create quantization matrix multipliers for each 8×8 block in the recompressed digital image 807 in a manner analogous to that illustrated in FIG. 6.

Figure 8A:
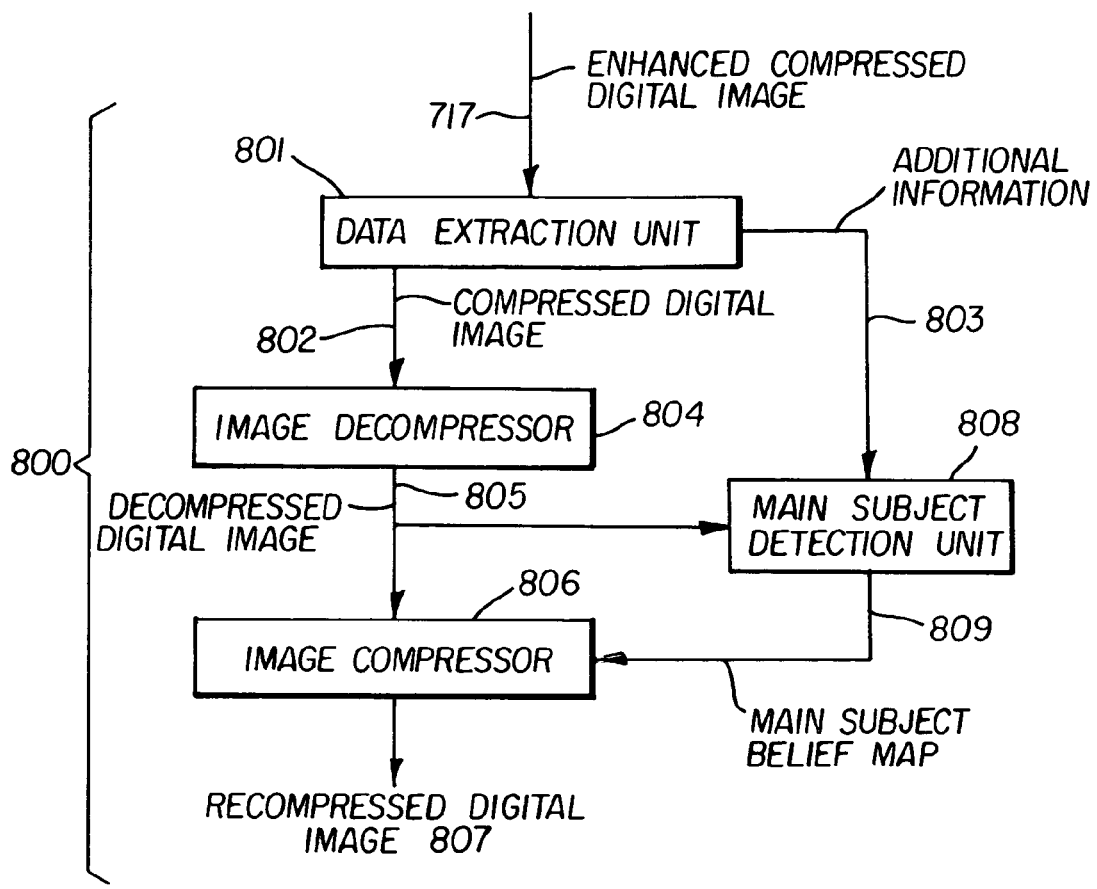
FIG. 8a is a block diagram of another embodiment of a transcoder for the present invention.
Figure 8B:
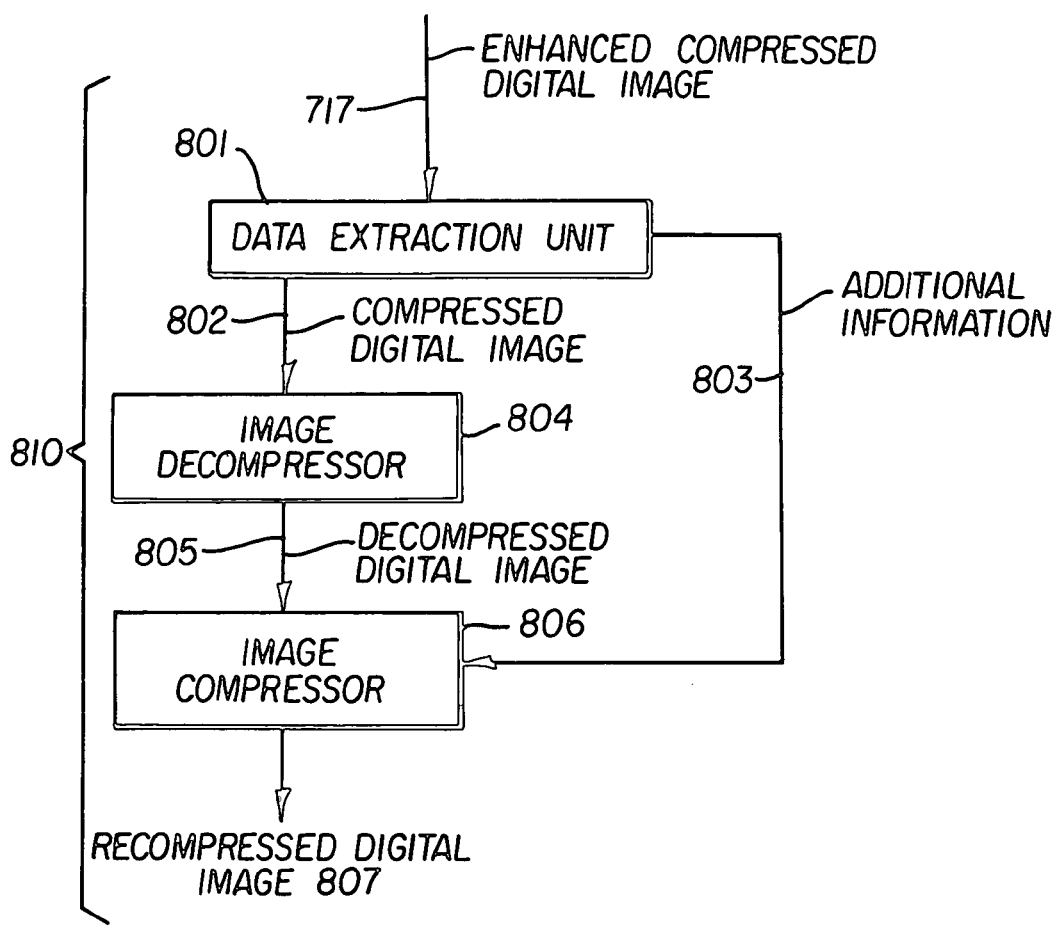
FIG. 8b is a block diagram of another embodiment of a transcoder for the present invention.

An alternative to a portion of the low bandwidth transcoder in FIG. 8a is illustrated in FIG. 8b. The main difference between transcoder 800 in FIG. 8a and transcoder 810 in FIG. 8b is that in the transcoder 810 in FIG. 8b, the main subject belief map is not calculated at all. Some or all of the additional information 803 is utilized by the image compressor 806 to control the amount of compression of different regions of the decompressed digital image 805. Such an embodiment may be preferred, for example, in a motion imaging system in which the computational requirements of the belief map calculation are beyond the capability of the transcoder technology.

Figure 9:
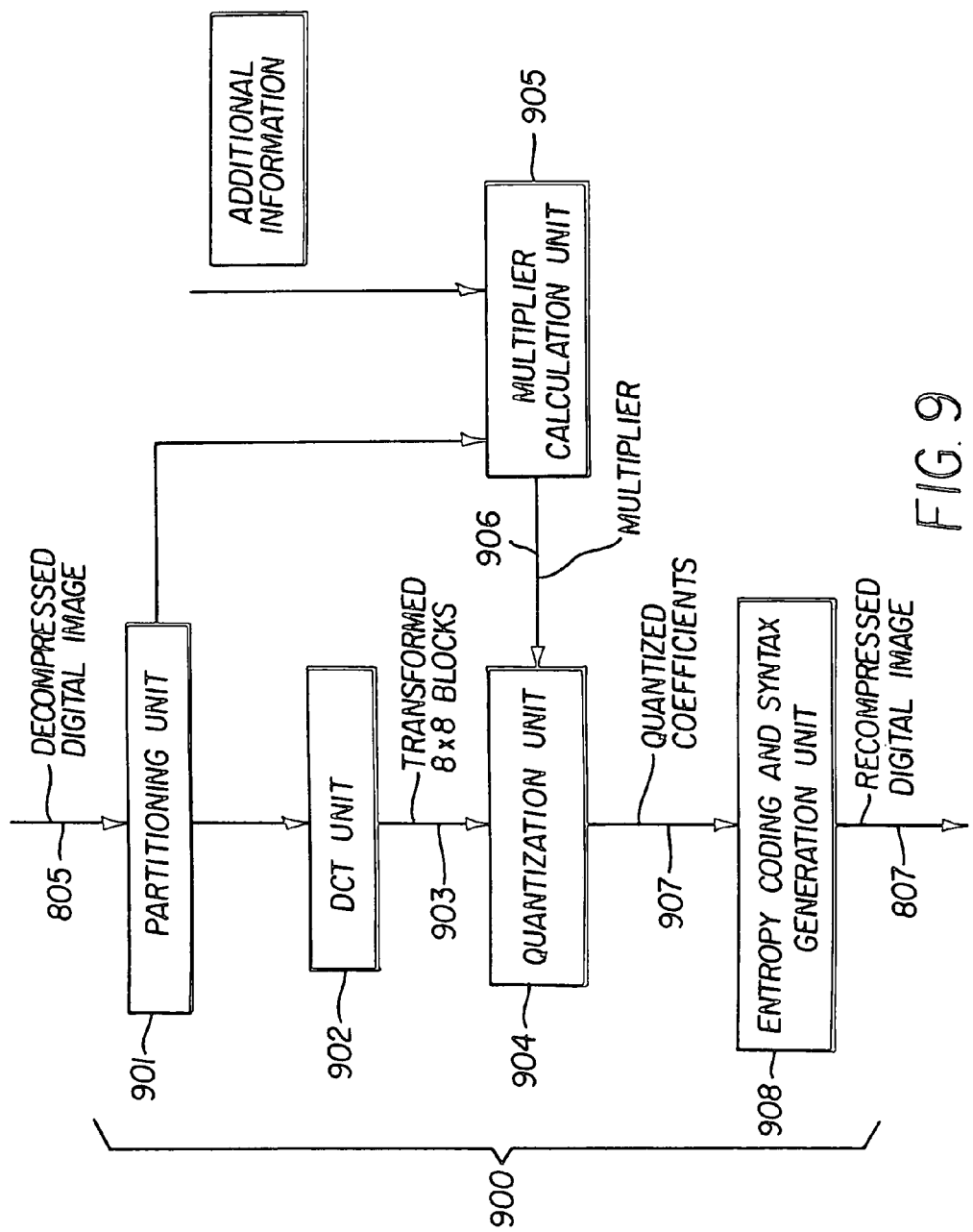
FIG. 9 is a block diagram of one embodiment of image compressor used in the transcoder shown in FIG. 8b.

A particular embodiment of a transcoder based on the Discrete Cosine Transform (DCT) coding, such as JPEG extension, MPEG, or H.263, is illustrated in FIG. 9. The transcoder 900 is very similar to that shown in FIG. 6. The only difference is that instead of using the main subject belief map 403 for spatially adaptive quantization, it uses the additional information 803. The decompressed digital image 805 is partitioned into 8×8 blocks by the partitioning unit 901. The additional information 803 is fed to a multiplier calculation unit 905, which calculates the multiplier 906 for each 8×8 block based on the additional information 803. In a preferred embodiment, the additional information 803 consists of the depth map. The depth map is normalized by dividing it by the highest depth value for that image. Then the average normalized depth value for each 8×8 block is calculated.

The JPEG-extension allows two pre-specified tables for multiplier values (linear or non-linear). In a preferred embodiment, the linear table is used. For the linear table, the entries range from ($1/16$) to ($31/16$) in increments of ($1/16$). Since the average of normalized depth values for an 8×8 block is between 0 and 1, in a preferred embodiment, the multiplier is determined as $$\text{multiplier} = \frac{\lfloor \text{average} \times 32.0 \rfloor}{16} \quad \text{(Equation 14)}$$

where average represents the average normalized depth value for the 8×8 block and $\lfloor x \rfloor$ represents the greatest integer less than or equal to x. The resulting multiplier value is clipped to the range [$\frac{1}{16}$, $\frac{31}{16}$]. As expected, the multipliers for the blocks with higher average depth values are higher, resulting in coarser quantization. This is appropriate because objects that are farther away are thought to be of less importance visually. Those skilled in the art will recognize that it is possible to use any other mapping as long as higher average depth values get mapped to higher multiplication factors.

The DCT unit 902 transforms each 8×8 block using two-dimensional discrete cosine transform (2-D DCT) to produce transformed 8×8 blocks 903. The quantization unit 904 quantizes the DCT coefficients using the appropriate quantization matrix and the multiplier 906 supplied by the multiplier calculation unit 905 to produce quantized coefficients 907. Then, the entropy coding and syntax generation unit 908 generates the recompressed digital image 807 that is compatible with the extension to the JPEG standard. Those skilled in the art will recognize that the same approach of varying the quantization based on the average belief value for an 8×8 block can be used to compress intra- and inter-coded 8×8 blocks in MPEG and H.263 family of algorithms for recompressing a motion sequence.

Those skilled in the art will further recognize that the scheme illustrated in FIG. 9 can be modified to utilize other forms of additional information. For example, the activity map or gaze information may be utilized by the multiplier calculation unit 905, in which the calculation of the multiplier 906 is tailored to the characteristics of the particular additional information.

The invention has been described with reference to a preferred embodiment; However, it will be appreciated that variations and modifications can be effected by a person of ordinary skill in the art without departing from the scope of the invention.

| PARTS LIST: | |
|---|---|
| 100 | prior art digital image capture and processing system |
| 101 | digital image capture device |
| 102 | computer |
| 103 | network |
| 104 | local data storage |
| 105 | high resolution color monitor |
| 106 | hard copy output printer |
| 107 | keyboard |
| 108 | mouse |
| 200 | camera |
| 201 | lens/iris assembly |
| 202 | image sensor |
| 203 | A/D converter |
| 204 | sensor signal processing operation |
| 205 | digital image data |
| 206 | image compressor |
| 207 | compressed digital image data |
| 208 | main subject detection unit |
| 209 | belief map |
| 210 | gaze tracking sensor |
| 211 | gaze tracking algorithm |
| 212 | gaze information |
| 213 | depth sensor |
| 214 | depth image algorithm |
| 215 | depth map |
| 216 | belief map compression unit |
| 217 | additional information |
| 218 | associating unit |
| 219 | enhanced compressed digital image |
| 220 | storage device |
| 301 | image segmentation unit |
| 302 | feature extraction unit |
| 303 | belief computation |
| 400 | transcoder |
| 401 | data extraction unit |
| 402 | compressed digital image data |
| 403 | main subject belief map |
| 404 | image decompressor |
| 405 | decompressed digital image |
| 406 | image compressor |
| 407 | recompressed digital image |
| 500 | JPEG2000 image encoder |
| 501 | subband decomposition operation |
| 502 | subband coefficients |
| 503 | codeblock partitioning unit |
| 504 | codeblocks |
| 505 | codeblock compression unit |
| 506 | compressed codeblock bit-stream |
| 507 | byte-count table |
| 508 | distortion-weight calculation unit |
| 509 | distortion weights |
| 510 | bit-budget |
| 511 | rate-control unit & JPEG2000 bit-stream organizer |
| 600 | transform coder |
| 601 | partitioning unit |
| 602 | DCT unit |
| 603 | transformed 8 × 8 blocks |
| 604 | quantization unit |
| 605 | multiplier calculation unit |
| 606 | multiplier |
| 607 | quantized coefficients |
| 608 | entropy coding and syntax generation unit |
| 701 | lens/iris assembly |
| 702 | image sensor |
| 703 | A/D converter |
| 704 | sensor signal processing |
| 705 | digital image data |
| 706 | image compressor |
| 707 | compressed digital image data |
| 708 | gaze tracking sensor |
| 709 | gaze tracking algorithm |
| 710 | gaze information |
| 711 | depth sensor |
| 712 | depth image algorithm |
| 713 | depth map |
| 714 | additional information compression unit |
| 715 | additional information |
| 716 | associating unit |
| 717 | enhanced compressed digital image |
| 718 | storage device |
| 719 | activity calculation unit |
| 720 | activity map |
| 800 | bandwidth transcoder |
| 801 | data extraction unit |
| 802 | compressed digital image |
| 803 | additional information |
| 804 | image decompressor |
| 805 | decompressed digital image |
| 806 | image compressor |
| 807 | recompressed digital image |
| 808 | main subject detection unit |
| 809 | main subject belief map |
| 810 | alternate low bandwidth transcoder |
| 900 | dot-based transcoder |
| 901 | partitioning unit |
| 902 | DCT unit |
| 903 | transformed 8 × 8 blocks |

-continued

| PARTS LIST: | |
|---|---|
| 904 | quantization unit |
| 905 | multiplier calculation unit |
| 906 | multiplier |
| 907 | quantized coefficients |
| 908 | entropy coding and syntax generation unit |

What is claimed is:

1. A method for generating an enhanced compressed digital image, for comprising the steps of:
 a) capturing a digital image;
 b) generating additional information from a main subject belief map, containing a continuum of belief values, relating to the importance of a photographed subject and its corresponding background regions within the digital image;
 b1) extracting regions of homogeneous properties from the digital image;
 b2) extracting for each of the regions, at least one structural saliency feature and at least one semantic saliency feature; and
 b3) integrating the at least one structural saliency feature and the at least one semantic saliency feature using a probabilistic reasoning engine into an estimate of a belief that each region is the main subject;
 c) compressing the digital image to form a compressed digital image;
 d) associating the additional information with the compressed digital image to generate the enhanced compressed digital image; and
 e) storing the enhanced compressed digital image in a data storage device.

2. The method claimed in claim 1, wherein the additional information generated in step (b) is further compressed to generate compressed additional information before the associating step.

3. The method claimed in claim 2, wherein the step of further compressing the additional information employs a lossless compression technique.

4. The method claimed in claim 1 wherein the digital image is one of a sequence of digital motion images.

5. The method claimed in claim 1 wherein the step of compressing the digital image employs JPEG compression technique.

6. The method claimed in claim 1 wherein the step of compressing the digital image employs JPEG 2000 compression technique.

7. The method claimed in claim 1 wherein generating the additional information further comprises the steps of:
 b) collecting data from separate sensing elements, wherein all data is collected at the time of capturing the digital image.

8. The method claimed in claim 1 wherein generating the main subject belief map further comprises the steps of:
 b4) collecting data from separate sensing elements, wherein all data is collected at the time of capturing the digital image; and
 b5) utilizing the collected data for modifying the estimate of the belief that each region is the main subject.

9. The method claimed in claim 1 wherein the step of generating additional information includes the steps of:
 a) calculating a representation of a relative strength of high-frequency components in regions of the image; and
 b) compressing and encoding the representation of the relative strength of high-frequency components for inclusion with the compressed digital image.

10. The method claimed in claim 1 wherein the step of generating the additional information comprises the steps of:
 a) tracking eye movement, during capture, using eye tracking sensors in a camera viewfinder;
 b) generating gaze-tracking data from the eye tracking sensors; and
 c) encoding the gaze-tracking data.

11. The method claimed in claim 1 wherein the step of generating the additional information comprises the steps of:
 a) capturing a depth map of objects in each frame using a depth sensor;
 b) generating depth data from the depth sensor; and
 c) encoding the depth data.

* * * * *